United States Patent
Ishii et al.

(10) Patent No.: US 11,970,607 B2
(45) Date of Patent: Apr. 30, 2024

(54) POLYACETAL RESIN COMPOSITION, AND, MOLDED ARTICLE

(71) Applicant: MITSUBISHI ENGINEERING-PLASTICS CORPORATION, Tokyo (JP)

(72) Inventors: Takashi Ishii, Hiratsuka (JP); Tsuyoshi Isozaki, Hiratsuka (JP)

(73) Assignee: GLOBAL POLYACETAL CO., LTD., Tokyo (JP)

(*) Notice: Subject to any disclaimer, the term of this patent is extended or adjusted under 35 U.S.C. 154(b) by 686 days.

(21) Appl. No.: 17/258,606

(22) PCT Filed: Jul. 9, 2019

(86) PCT No.: PCT/JP2019/027160
§ 371 (c)(1),
(2) Date: Jan. 7, 2021

(87) PCT Pub. No.: WO2020/013185
PCT Pub. Date: Jan. 16, 2020

(65) Prior Publication Data
US 2021/0269634 A1 Sep. 2, 2021

(30) Foreign Application Priority Data
Jul. 11, 2018 (JP) .................................. 2018-131851

(51) Int. Cl.
| | |
|---|---|
| *C08L 59/00* | (2006.01) |
| *B60K 15/03* | (2006.01) |
| *C08K 5/098* | (2006.01) |
| *C08L 53/00* | (2006.01) |
| *C08L 71/02* | (2006.01) |
| *C08L 87/00* | (2006.01) |

(52) U.S. Cl.
CPC .............. *C08L 59/00* (2013.01); *B60K 15/03* (2013.01); *C08K 5/098* (2013.01); *C08L 53/00* (2013.01); *C08L 71/02* (2013.01); *C08L 87/005* (2013.01); *B60K 2015/03243* (2013.01); *C08L 2203/30* (2013.01)

(58) Field of Classification Search
CPC .......... C08L 59/00; C08L 59/02; C08L 59/04; C08L 71/02; C08K 5/098
See application file for complete search history.

(56) References Cited

U.S. PATENT DOCUMENTS

| | | | |
|---|---|---|---|
| 2005/0209390 A1* | 9/2005 | Yagi ...................... | B60C 1/0016 524/493 |
| 2007/0010633 A1 | 1/2007 | Park et al. | |
| 2011/0086952 A1 | 4/2011 | Bessho et al. | |

FOREIGN PATENT DOCUMENTS

| | | |
|---|---|---|
| CN | 1910233 A | 2/2007 |
| CN | 101445640 A | 6/2009 |
| CN | 105683282 A | 6/2016 |
| JP | 6-279652 A | 10/1994 |
| JP | 2001-142176 A | 5/2001 |
| JP | 2008-321880 A | 11/2006 |
| JP | 2008-247994 A | 10/2008 |
| JP | 2009-132768 A | 6/2009 |
| JP | 2010-31200 A | 2/2010 |
| JP | 2012-162589 A | 8/2012 |
| JP | 2015-34221 A | 2/2015 |

OTHER PUBLICATIONS

Chinese Office Action for corresponding Chinese Application No. 201980045747.X, dated Feb. 12, 2023, with English translation.
Japanese Office Action for corresponding Japanese Application No. 2020-530201, dated Mar. 7, 2023, with an English translation.
International Preliminary Report on Patentability and Written Opinion of the International Searching Authority with an English translation (forms PCT/IB/373 and PCT/ISA/237), dated Jan. 12, 2021, for corresponding International Application No. PCT/JP2019/027160.
Brazilian Office Action issued in corresponding Brazilian Patent Application No. BR112021000176, dated Aug. 30, 2022, with partial English translation.
Extended European Search Report for corresponding European Application No. 19833860.0, dated Apr. 28, 2022.
Indian Office Action for corresponding Indian Application No. 202117003042, dated Apr. 18, 2022, with an English translation.
Brazilian Office Action dated Sep. 5, 2023 for corresponding Application No. BR112021000176-0 with a partial English translation.
Indian Hearing Notice dated Nov. 1, 2023 for corresponding Application No. 202117003042 with an English translation.

* cited by examiner

*Primary Examiner* — Jeffrey C Mullis
(74) *Attorney, Agent, or Firm* — Birch, Stewart, Kolasch & Birch, LLP

(57) ABSTRACT

To provide a polyacetal resin composition and a molded article thereof, which are less likely to crack even if stressed in contact with any hydrochloric acid-containing liquid. The polyacetal resin composition contains, per 100 parts by mass of a polyacetal resin: 0.01 to 10 parts by mass of at least one fatty acid metal salt selected from 1) to 3) below; and 0.1 to 5 parts by mass of a stress relaxant having a melting point of 67.5° C. to 200° C. when measured by using a differential scanning calorimeter at a flow rate of nitrogen of 20 cm³/min and at a heating rate of 10° C./min.
1) metal salt formed of long chain fatty acid having 10 to 34 carbon atoms and calcium;
2) metal salt formed of long chain fatty acid having 10 to 34 carbon atoms and zinc; and,
3) metal salt formed of long chain fatty acid having 10 to 34 carbon atoms and magnesium.

12 Claims, No Drawings

POLYACETAL RESIN COMPOSITION, AND, MOLDED ARTICLE

TECHNICAL FIELD

This invention relates to a polyacetal resin composition and a molded article, and in particular to a molded article used for fuel pump module.

BACKGROUND ART

Polyacetal resin, a representative engineering plastic, is well balanced among mechanical strength, chemical resistance, slidability and wear resistance, easy to process, and has therefore been widely used for mechanical components for electric and electronic devices, and mechanical components for vehicles and so forth. As the field of application expands, higher levels of performance have increasingly been required for the polyacetal resin.

For example, Patent Literature 1 discloses a polyacetal resin composition that includes (A) 100 parts by mass of a polyacetal resin, (B) 0.1 to 2 parts by mass of zinc oxide, and (C) 0.1 to 5 parts by mass of a sliding modifier, wherein the (B) zinc oxide has a number-average particle size of 70 to 500 nm.

CITATION LIST

Patent Literature

[Patent Literature 1] JP-A-2015-34221

SUMMARY OF THE INVENTION

Technical Problem

Polyacetal resin is also studied to be applied to vehicle components, in particular to fuel pump module. Vehicles are often washed at gas station or the like, using detergent. It was however made clear that in some cases components inside the vehicles would crack under stress, if hydrochloric acid-containing detergent is used as the detergent. If such component inside the vehicle were a fuel pump module, the damage would be serious.

This invention is aimed at solving the problem, and is to provide a polyacetal resin composition and a molded article thereof, which are less likely to crack even if stressed in contact with any hydrochloric acid-containing liquid.

Solution to Problem

The present inventors conducted research to address the above-mentioned problems, and as a result, discovered that the above problems could be solved and completed this invention by adding long chain fatty acid having 10 to 34 carbon atoms, fatty acid metal salt formed of a predetermined metal and a stress relaxant having a melting point of 67.5° C. to 200° C. to a polyacetal resin. Specifically, the problems described above are solved by the following means <1>, and preferably by the following means <2> to <9>.

<1> A polyacetal resin composition comprising, per 100 parts by mass of a polyacetal resin: 0.01 to 10 parts by mass of at least one fatty acid metal salt selected from 1) to 3) below; and 0.1 to 5 parts by mass of a stress relaxant having a melting point of 67.5° C. to 200° C. when measured by using a differential scanning calorimeter at a flow rate of nitrogen of 20 cm$^3$/min and at a heating rate of 10° C./min.
  1) metal salt formed of long chain fatty acid having 10 to 34 carbon atoms and calcium;
  2) metal salt formed of long chain fatty acid having 10 to 34 carbon atoms and zinc; and,
  3) metal salt formed of long chain fatty acid having 10 to 34 carbon atoms and magnesium <2> The polyacetal resin composition of <1>, containing, as the fatty acid metal salt, at least two kinds selected from 1) to 3) above.

<3> The polyacetal resin composition of <1>, containing, as the fatty acid metal salt, both of the metal salt formed of long chain fatty acid having 10 to 34 carbon atoms and calcium, and the metal salt formed of long chain fatty acid having 10 to 34 carbon atoms and zinc.

<4> The polyacetal resin composition described in <1>, wherein the fatty acid metal salt is selected from the metal salt of long chain fatty acid having 10 to 34 carbon atoms and calcium, and the metal salt of long chain fatty acid having 10 to 34 carbon atoms and zinc.

<5> The polyacetal resin composition described in <1>, containing, as the fatty acid metal salt, both of the metal salt formed of long chain fatty acid having 10 to 34 carbon atoms and calcium, and the metal salt formed of long chain fatty acid having 10 to 34 carbon atoms and magnesium.

<6> The polyacetal resin composition described in any one of <1> to <5>, wherein the stress relaxant is selected from the group consisting of polyether ester amide block copolymer, polyolefin/polyether copolymer, polyamide/polyalkylene glycol block copolymer, polyethylene glycol having a number-average molecular weight of 20,000 or larger, and, polyethylene oxide having a number-average molecular weight of 20,000 or larger.

<7> The polyacetal resin composition described in any one of <1> to <6>, being durable against a liquid containing hydrochloric acid.

<8> The polyacetal resin composition described in any one of <1> to <7>, used for a fuel pump module.

<9> A molded article formed of the polyacetal resin composition described in any one of <1> to <8>.

<10> The molded article of <9>, used for a fuel pump module.

Advantageous Effects of Invention

This invention is the first to provide a polyacetal resin composition and a molded article thereof, which are less likely to crack even if stressed in contact with a hydrochloric acid-containing liquid.

DESCRIPTION OF EMBODIMENTS

This invention will be detailed below. Note that all numerical ranges given in this patent specification, using "to" preceded and succeeded by numerals, are used to represent the ranges including these numerals respectively as the lower and upper limit values.

The polyacetal resin composition of this invention includes, per 100 parts by mass of a polyacetal resin:

0.01 to 10 parts by mass of at least one fatty acid metal salt selected from 1) to 3) below; and 0.1 to 5 parts by mass of a stress relaxant having a melting point of 67.5° C. to 200° C. when measured by using a differential scanning calorimeter at a flow rate of nitrogen of 20 cm³/min and at a heating rate of 10° C./min,
1) metal salt formed of long chain fatty acid having 10 to 34 carbon atoms and calcium;
2) metal salt formed of long chain fatty acid having 10 to 34 carbon atoms and zinc; and,
3) metal salt formed of long chain fatty acid having 10 to 34 carbon atoms and magnesium.

As described above, a molded article formed of a polyacetal resin composition would crack under stress in some cases, if exposed to any hydrochloric acid-containing liquid.

In this invention, the metal salt formed of long chain fatty acid having 10 to 34 carbon atoms and at least one of calcium, zinc and magnesium (fatty acid metal salt) is added to the polyacetal resin, wherein the fatty acid metal salt in this invention is presumed to act as a particularly effective neutralizer for the hydrochloric acid-containing liquid.

Moreover, by employing, as the stress relaxant, a stress relaxant having a relatively low melting point as compared with the polyacetal resin, such stress relaxant is considered to effectively disperse into the polyacetal resin during melt kneading, and to effectively demonstrate stress resistance.

The polyacetal resin composition of this invention will be detailed below, of course without limiting this invention.

<(A) Polyacetal Resin>

The (A) polyacetal resin used in this invention is a polymer having an acetal structure —(—O—CRH—)$_n$— (where, R represents a hydrogen atom or an organic group) as the repeating unit, and normally having, as a major structural unit, an oxymethylene group (—CH$_2$O—) where R represents a hydrogen atom. The polyacetal resin used in this invention may contain, besides an acetal homopolymer solely composed of such repeating structure, a copolymer (including block copolymer) and terpolymer and so forth containing one or more kinds of repeating structural units other than the oxymethylene group, and may even contain not only a linear structure, but also a branched or crosslinked structure.

The structural unit other than the oxymethylene group is exemplified by optionally-branched oxyalkylene groups having 2 to 10 carbon atoms such as oxyethylene group (—CH$_2$CH$_2$O—), oxypropylene group (—CH$_2$CH$_2$CH$_2$O—) and oxybutylene group (—CH$_2$CH$_2$CH$_2$CH$_2$O—). Among them, optionally-branched oxyalkylene groups having 2 to 4 carbon atoms are preferred, and oxyethylene group is particularly preferred. Content of such oxyalkylene structural unit other than oxymethylene group is preferably 0.1 mol % or more and 20 mol % or less in the polyacetal resin, and is more preferably 0.1 mol % or more and 15 mol % or less.

The polyacetal resin used in this invention may be manufactured by a freely selectable method, according to any of known methods of manufacturing. For example, a polyacetal resin having oxymethylene group, and oxyalkylene group having 2 to 4 carbon atoms as the structural units, is manufacturable by a method in which a cyclic oligomer of oxymethylene group, such as trimer (trioxane) or tetramer (tetraoxane) of formaldehyde, is copolymerized with a cyclic oligomer that contains the oxyalkylene group having 2 to 4 carbon atoms, such as ethylene oxide, 1,3-dioxolane, 1,3,6-trioxocane and 1,3-dioxepane.

In particular, the polyacetal resin used in this invention is preferably a copolymer that contains a cyclic oligomer such as trioxane, tetraoxane and so forth, copolymerized with ethylene oxide or 1,3-dioxolane; and in particular, a copolymer of trioxane and 1,3-dioxolane. The melt viscosity, although freely selectable, is typically represented by a melt index (MI) [ASTM D 1238: 190° C., under 2.16 kg load] of 0.01 to 150 g/10 min, which is more preferably 0.1 to 100 g/10 min, and particularly 1 to 70 g/10 min.

The polyacetal resin used in this invention preferably has a melting point of 170° C. or higher, which is more preferably higher than 200° C., and even may be 210° C. or higher. The upper limit value may typically 230° C. or below, although not specifically limited. Employment of such polyacetal resin can further improve dispersibility of the stress relaxant, and can more effectively moderate stress exerted on the molded article formed of the polyacetal resin composition of this invention.

Melting point of the polyacetal resin is measured according to a method described later in EXAMPLES. Any equipment described in EXAMPLES, not available now due to discontinuation or the like, may be replaced with other equipment having equivalent performances.

The polyacetal resin composition of this invention preferably contains 80% by mass of polyacetal resin, wherein the content is more preferably 85% by mass or more, and even may be 90% by mass or more. The polyacetal resin composition of this invention may contain only one kind of the polyacetal resin, or may contain two or more kinds. When two or more kinds are contained, the total content preferably falls within the aforementioned ranges.

<(B) Fatty Acid Metal Salt>

The polyacetal resin composition of this invention contains at least one fatty acid metal salt selected from 1) to 3) below. The fatty acid metal salt acts as a neutralizer for the hydrochloric acid-containing liquid.
1) Metal salt formed of long chain fatty acid having 10 to 34 carbon atoms and calcium;
2) metal salt formed of long chain fatty acid having 10 to 34 carbon atoms and zinc; and,
3) metal salt formed of long chain fatty acid having 10 to 34 carbon atoms and magnesium.

The polyacetal resin composition of this invention more preferably contains a fatty acid metal salt, selected from metal salt of long chain fatty acid having 10 to 34 carbon atoms and calcium, or the metal salt of long chain fatty acid having 10 to 34 carbon atoms and zinc.

The long chain fatty acid is preferably a straight-chain saturated long chain fatty acid.

The lower limit of the number of carbon atoms of the long chain fatty acid is 12 or above, more preferably 14 or above, even more preferably 16 or above, and yet may be 18 or above. Meanwhile, the upper limit of the number of carbon atoms of the long chain fatty acid is preferably 32 or below, more preferably 30 or below, and even may be 28 or below.

Specific examples of the long chain fatty acid include stearic acid, ricinoleic acid, montanic acid and so forth. Among them, stearic acid is preferred. The polyacetal resin composition of this invention preferably contains at least two of the aforementioned 1) to 3), and preferably contains both of the metal salt formed of long chain fatty acid having 10 to 34 carbon atoms and calcium, and the metal salt formed of long chain fatty acid having 10 to 34 carbon atoms and zinc. With such structure, the lifetime when kept in contact with acidic solution may further be elongated. It is also preferable to contain both of the metal salt formed of long chain fatty acid having 10 to 34 carbon atoms and calcium, and the meal salt of long chain fatty acid having 10 to 34 carbon atoms and magnesium.

When blending two or more kinds of the fatty acid metal salts 1) to 3), a first kind and a second kind are preferably blended at a ratio of 1:0.5 to 1.5, which is more preferably 1:0.8 to 1.2. With such ratio, the effect of this invention tends to be demonstrated more efficiently. In particular, in a case where both of the metal salt formed of long chain fatty acid having 10 to 34 carbon atoms and calcium, and the metal salt formed of long chain fatty acid having 10 to 34 carbon atoms and zinc are contained, the ratio by mass represented by (zinc salt):(calcium salt) is preferably 1:0.5 to 1.5, and more preferably 1:0.8 to 1.2. With such ratio, the effect of this invention tends to be demonstrated more efficiently.

In this invention, also preferred are an embodiment in which 90% by mass or more of the fatty acid metal salt contained in the polyacetal resin composition is a metal salt formed of long chain fatty acid having 10 to 34 carbon atoms and calcium, and an embodiment in which 90% by mass or more of the fatty acid metal salt contained in the polyacetal resin composition is a metal salt formed of long chain fatty acid having 10 to 34 carbon atoms and magnesium.

The polyacetal resin composition of this invention contains 0.1 to 10.0 parts by mass of a predetermined fatty acid metal salt per 100 parts by mass of polyacetal resin. The lower limit of the content is preferably 0.2 parts by mass or above, more preferably 0.3 parts by mass or above, and even may be 0.6 parts by mass or above. Meanwhile, the upper limit of the content is preferably 8.0 parts by mass or below, more preferably 6.0 parts by mass or below, even more preferably 4.0 parts by mass or below, yet more preferably 2.0 parts by mass or below, and furthermore preferably 1.0 parts by mass or below.

The polyacetal resin composition of this invention may contain one kind, or two or more kinds of the predetermined fatty acid metal salt. When two or more kinds are contained, the total content preferably falls within the aforementioned ranges.

The polyacetal resin composition of this invention preferably does not substantially contain any fatty acid metal salt other than the aforementioned predetermined fatty acid metal salt. Note that does not substantially contain means that the content of such other fatty acid metal salt is less than 1% by mass of the content of the predetermined fatty acid metal salt.

<(C) Stress Relaxant>

The polyacetal resin composition of this invention further contains a stress relaxant. As a result of containing the stress relaxant having elastic modulus smaller than that of the polyacetal resin, cracks due to residual stress may be effectively prevented from occurring.

The stress relaxant used in this invention has a melting point of 67.5° C. to 200° C. when measured by using a differential scanning calorimeter at a flow rate of nitrogen of 20 cm$^3$/min and at a heating rate of 10° C./min. With the use of such stress relaxant, the melting point thereof will tend to fall under the melting point of the polyacetal resin. As a consequence, the predetermined stress relaxant will more effectively disperse itself in the polyacetal resin during melt kneading of the individual ingredients, and will more effectively achieve stress relaxation.

The lower limit of the melting point of the stress relaxant is 70° C. or above, 100° C. or above, 130° C. or above, or may be 140° C. or above. In particular, the stress relaxant used in this invention preferably has a melting point lower by 0.1° C. or more than that of the polyacetal resin, which is more preferably lower by 0.1 to 140° C. or more, and even more preferably lower by 0.1 to 100° C. or more.

The stress relaxant is preferably at least one kind selected from the group consisting of polyether ester amide block copolymer, polyolefin/polyether copolymer, polyamide/polyalkylene glycol block copolymer, polyethylene glycol having a number-average molecular weight of 20,000 or larger, and, polyethylene oxide having a number-average molecular weight of 20,000 or larger; and is more preferably polyethylene oxide having a number-average molecular weight of 20,000 or larger.

The polyether ester amide block copolymer preferably has a melting point which is equivalent to that of the polyacetal (for example, with a difference of melting points fallen within 10° C.), or which is equivalent to temperature at which the polyacetal is actually processed (for example, 200° C.) (for example, difference between the melting point of copolymer and the process temperature falls within 10° C.)

The polyolefin contained in the polyolefin/polyether copolymer is preferably polyethylene or polypropylene. The polyether is preferably polyethylene glycol, preferably with the melting point equivalent to that of polyacetal (for example, with a difference of melting point fallen within 10° C.), or equivalent to temperature at which the polyacetal is actually processed (for example, 200° C.) (for example, difference between the melting point of copolymer and the process temperature falls within 10° C.)

The polyethylene glycol having a number-average molecular weight of 20,000 or larger preferably has a number-average molecular weight of 20,000 to 100,000, which is more preferably 20,000 to 50,000.

The polyethylene oxide having a number-average molecular weight of 20,000 or larger preferably has a number-average molecular weight of 20,000 to 500,000, which is more preferably 80,000 to 300,000, and even more preferably 100,000 to 200,000.

The melting point and the number-average molecular weight of the stress relaxant used in this invention, when commercially acquired, may be cited from catalog values.

The polyacetal resin composition of this invention preferably contains 0.1 to 5.0 parts by mass of the stress relaxant per 100 parts by mass of the polyacetal resin. The lower limit of the content is preferably 0.2 parts by mass ow above, more preferably 0.5 parts by mass or above, even more preferably 0.7 parts by mass or above, yet more preferably 1.0 parts by mass or above, and even may be 1.2 parts by mass or above. Meanwhile, the upper limit of the content is more preferably 4.0 parts by mass or below, even more preferably 3.0 parts by mass or below, and yet more preferably 2.0 parts by mass or below.

The polyacetal resin composition of this invention may contain one kind, or two or more kinds of the stress relaxant. When two or more kinds are contained, the total content preferably falls within the aforementioned ranges.

<Other Ingredients>

The polyacetal resin composition of this invention may contain, besides the aforementioned ingredients, optional additives such as colorant, nucleating agent, plasticizer, fluorescent brightener, mold releasing agent, antistatic agent, UV absorber, antioxidant, fluidity modifier, antibacterial agent and sliding improver. Content of these additives, when used, preferably totals 0.1 to 10% by mass of the polyacetal resin composition.

In another preferred embodiment of the polyacetal resin composition of this invention, the total of the polyacetal resin, predetermined fatty acid metal salt, and the predetermined stress relaxant preferably accounts for 95% by mass or more of the composition, and more preferably accounts for 98% by mass or more.

Moreover, the polyacetal resin composition of this invention may be substantially free of nitrogen-containing compound having a molecular weight of smaller than 1000. Now "substantially free of . . . " means that the content is 1% by mass or less of the content of the predetermined fatty acid metal salt.

The polyacetal resin composition of this invention may further be free of inorganic compound. Now "substantially free of . . . " means that the content is 20% by mass or less of the content of the predetermined fatty acid metal salt, which is more preferably 10% by mass or less, even more preferably 3% by mass or less, and yet more preferably 1% by mass or less.

<Method for Manufacturing Polyacetal Resin Composition>

The polyacetal resin composition of this invention may be manufactured easily by any of known methods having been widely employed as a method for preparing thermoplastic resin composition. Methods employable herein include (1) a method by which all ingredients that compose the composition are mixed, the mixture is fed to an extruder for melt-kneading, and then a pelletized composition is obtained; (2) a method by which a part of ingredients that compose the composition, fed through a main feed port of an extruder, and the residual ingredients, fed through a side feed port, are melt-kneaded, and then a pelletized composition is obtained; and (3) a method by which pellets with different chemical compositions are once prepared typically by extrusion, and the pellets were then mixed so as to be adjust to a predetermined chemical composition.

<Molded Article>

The molded article of this invention is formed of the polyacetal resin composition of this invention. Pellets obtained by pelletizing the polyacetal resin composition of this invention are molded by various molding methods to yield the molded article. Alternatively, the resin composition melt-kneaded in an extruder may be molded directly to yield the molded article, while skipping pelletization.

Shapes of the molded article may be properly selected without special limitation, depending on applications or purposes of the molded article, which are exemplified by those having shapes of board, plate, rod, sheet, film, cylinder, ring, circle, ellipse, gear, polygon, irregular shape, hollow shape, frame, box, panel, cap and so forth. The molded article of this invention may be a finished article, a component, or a welded article of the individual components.

Methods for molding the molded article may be any of known molding methods, without special limitation, wherein employable methods are exemplified by injection molding, injection compression molding, extrusion molding, profile molding, transfer molding, hollow molding, gas assist hollow molding, blow molding, extrusion blow molding, in-mold coating (IMC) molding, rotational molding, multilayer molding, two-color molding, insert molding, sandwich molding, foam molding, and pressure molding.

<Applications>

The polyacetal resin composition of this invention, and the molded article formed of the polyacetal resin composition are preferably used for applications in need of resistivity against hydrochloric acid-containing liquid.

More specifically, they are preferably used as described above for vehicle-related components, and especially for fuel pump module.

Besides those described above, they are also applicable to mechanical components represented by cam, slider, lever, arm, clutch, felt clutch, idler gear, pulley, roll, roller, key stem, key top, shutter, reel, shaft, joint, shaft, bearing, and guide; resin component obtained by outsert molding, resin component obtained by insert molding, chassis, tray, side wall, printer, internal components of HDD (lamp, latch, for example), and components for office automation equipment represented by copying machine; components for camera or video equipment represented by camera or video, video tape recorder (VTR), video movie, digital video camera, camera and digital camera; cassette player, and drives for DAT, Laser Disk (LD), Mini Disk (MD), Compact Disk (CD) [including CD-ROM (Read Only Memory), CD-R (Recordable), and CD-RW (Rewritable)], digital video disk (DVD) [including DVD-ROM, DVD-R, DVD+R, DVD-RW, DVD+RW, DVD-R DL, DVD+R DL, DVD-RAM (Random Access Memory), and DVD-Audio], Blu-ray (registered trademark) Disc, HD-DVD, and other optical disks; components for music, video or information equipment, represented by MFD, MO, navigation system and mobile persona computer, and components for communication equipment such as mobile phone and facsimile; components for electric equipment; and components for electronic equipment.

EXAMPLES

This invention will more specifically explained referring to Examples. All materials, amounts of consumption, ratios, process details, procedures and so forth explained below in EXAMPLES may properly be modified, without departing from the spirit of this invention. Hence, the scope of this invention is not limited by specific examples described below. Examples 1 to 9 and Comparative Examples 1 to 4

The individual ingredients were mixed as summarized in Table 1 or Table 2 below (amount of consumption of each ingredient in Table 1 or Table 2 is given in "parts by mass"), preliminarily blended, fed through a main feed port into a 30-mm-diameter twin screw extruder with a single vent hole, and melt kneaded (extrusion condition: L/D=35, extrusion temperature=190° C., screw speed=120 rpm), to prepare each pelletized composition.

Various materials listed in Table 1 or Table 2 are as follows.

(A) Polyacetal resin: Iupital F20-03, from Mitsubishi Engineering-Plastics Corporation, melting point=166° C.

(B) Fatty acid metal salts

Calcium stearate: Calcium Stearate GF-200, from NOF Corporation

Zinc stearate: Zinc Stearate GF-200, from NOF Corporation

Magnesium stearate: Magnesium Stearate GF-200, from NOF Corporation (C) Stress Relaxants Polyethylene oxide: PEO-1 (Mn150,000), from Sumitomo Seika Chemicals Co., Ltd., melting point=71° C.

Polyethylene glycol: PEG 20000 (Mn20,000), from Sanyo Chemical Industries, Ltd., melting point=68° C.

Polyether ester amide block copolymer: Pelestat 6500, from Sanyo Chemical Industries, Ltd., melting point=192° C.

Polyolefin/polyether copolymer: Pelestat 201, from Sanyo Chemical Industries, Ltd., melting point=164° C.

Polyamide-polyalkylene glycol block copolymer: Pelestat N1200, from Sanyo Chemical Industries, Ltd., melting point=149° C.

Polyethylene glycol: PEG 6000, from Sanyo Chemical Industries, Ltd., melting point=66° C.

PA6: polyamide 6, from Ube Industries, Ltd., 1013B

Others

Melamine: from Mitsui Chemicals, Inc.

Magnesium hydroxide: S-6F, from Konoshima Co., Ltd.

Zinc oxide: Product name: Activated zinc oxide, from Hakusui Tech Co., Ltd.

<Measurement of Melting Points>

Melting points of the resin and the stress relaxants were measured by using a differential scanning calorimeter, at a flow rate of nitrogen of 20 cm$^3$/min and at a heating rate of 10° C./min.

The differential scanning calorimeter employed here was PYRIS Diamond DSC.

<Molding of Molded Article>

The pellets obtained above (polyacetal resin composition) were injection molded at a die temperature of 80° C. and at a cylinder temperature of 190° C., according to ISO 294-1, to produce each dumbbell-shaped multipurpose test specimen (A1).

The thus obtained molded article (dumbbell-shaped ISO multipurpose test specimen) was evaluated as follows.

<Occurrence of Crack in Stress Corrosion Test with Use of Hydrochloric Acid>

The dumbbell-shaped ISO test specimen was fixed on a three-point bending jig, with a spacer set so as to apply 1% strain to the dumbbell-shaped test specimen, then 5% by mass of aqueous hydrochloric acid solution was dropped onto the point of strain, and a cover glass was placed thereon so as to avoid dryness. Time at which a crack occurs was then monitored by using a fixed point camera. Specimens not produced cracks within 72 hours were judge to be on a practical level (A), and those produced cracks were judged to be not on a practical level (B).

Results were summarized in Table 1 or Table 2.

TABLE 1

| | | | Melting point | Example 1 | Example 2 | Example 3 | Example 4 | Example 5 | Example 6 | Example 7 |
|---|---|---|---|---|---|---|---|---|---|---|
| Chemical composition | (A) Polyacetal resin | | 170° C. | 100 | 100 | 100 | 100 | 100 | 100 | 100 |
| | (B) Fatty acid metal salt | Calcium stearate | — | 0.4 | 0.4 | 0.4 | 0.4 | 0.4 | 0.4 | |
| | | Zinc stearate | — | 0.4 | 0.4 | 0.4 | 0.4 | 0.4 | | 0.4 |
| | | Magnesium stearate | — | | | | | | 0.4 | 0.4 |
| | (C) Stress relaxant | Polyethylene oxide | 71° C. | 1.5 | | | | | | |
| | | Polyethylene glycol, PEG 20000 | 68° C. | | 1.5 | | | | | |
| | | Polyether ester amide block copolymer | 192° C. | | | 1.5 | | | | |
| | | Polyolefin/Polyether copolymer | 164° C. | | | | | 1.5 | 1.5 | 1.5 |
| | | Polyamide polyalkylene glycol block copolymer | 149° C. | | | | 1.5 | | | |
| | | Polyethylene glycol, PEG 6000 | 66° C. | | | | | | | |
| | | PA6 | 215° C. | | | | | | | |
| | Nitrogen-containing compound | Melamine | — | | | | | | | |
| | Inorganic compound | Magnesium hydroxide | — | | | | | | | |
| | | Zinc oxide | | | | | | | | |
| Acid resistance | Occurrence of crack in stress corrosion test with use of 5%-by-mass hydrochloric acid | | | A | A | A | A | A | A | A |

TABLE 2

| | | | Melting point | Example 8 | Example 9 | Comparative Example 1 | Comparative Example 2 | Comparative Example 3 | Comparative Example 4 |
|---|---|---|---|---|---|---|---|---|---|
| Chemical composition | (A) Polyacetal resin | | 170° C. | 100 | 100 | 100 | 100 | 100 | 100 |
| | (B) Fatty acid metal salt | Calcium stearate | — | 0.8 | | 0.4 | | | 0.4 |
| | | Zinc stearate | — | | | 0.4 | | | 0.4 |
| | | Magnesium stearate | — | | 0.8 | | | | |
| | (C) Stress relaxant | Polyethylene oxide | 71° C. | | | | | | |
| | | Polyethylene glycol, PEG 20000 | 68° C. | | | | 1.5 | | |
| | | Polyether ester amide block copolymer | 192° C. | | | | | | |
| | | Polyolefin/Polyether copolymer | 164° C. | 1.5 | 1.5 | | | | |
| | | Polyamide polyalkylene glycol block copolymer | 149° C. | | | | | | |
| | | Polyethylene glycol, PEG 6000 | 66° C. | | | 1.5 | | 1.5 | |
| | | PA6 | 215° C. | | | | | | 1.5 |
| | Nitrogen-containing compound | Melamine | — | | | | 0.4 | | |
| | Inorganic compound | Magnesium hydroxide | — | | | | 0.4 | | |
| | | Zinc oxide | | | | | | 0.8 | |
| Acid resistance | Occurrence of crack in stress corrosion test with use of 5%-by-mass hydrochloric acid | | | A | A | B | B | B | B |

As is clear from the results, the molded articles formed of the polyacetal resin composition of this invention were found to suppress cracks from occurring in the stress corrosion test (Examples 1 to 9).

In contrast, the cases with the melting point of the stress relaxant lower than 67.5° C. (Comparative Examples 1, 3) were found to produce the cracks in the stress corrosion test within short times. The case with the molting point of the stress relaxant exceeding 200° C. (Comparative Example 4) was found to produce the crack in the stress corrosion test within a short time.

Meanwhile, the case that employed melamine and magnesium hydroxide, known as substitutes in place of the metal salt formed of the long chain fatty acid having 10 to 34 carbon atoms and calcium or zinc (Comparative Example 2) was also found to produce the crack in the stress corrosion test within a short time.

The invention claimed is:

1. A polyacetal resin composition comprising, per 100 parts by mass of a polyacetal resin:
   0.01 to 10 parts by mass of at least two fatty acid metal salts selected from 1) to 3) below; and
   0.1 to 5 parts by mass of a stress relaxant having a melting point of 67.5° C. to 200° C. when measured by using a differential scanning calorimeter at a flow rate of nitrogen of 20 cm$^3$/min and at a heating rate of 10° C./min,
   1) Metal salt formed of long chain fatty acid having 10 to 34 carbon atoms and calcium;
   2) Metal salt formed of long chain fatty acid having 10 to 34 carbon atoms and zinc; and,
   3) metal salt formed of long chain fatty acid having 10 to 34 carbon atoms and magnesium.

2. A polyacetal resin composition comprising, per 100 parts by mass of a polyacetal resin:
   0.01 to 10 parts by mass of fatty acid metal salts, wherein the fatty acid metal salts are both of a metal salt formed of long chain fatty acid having 10 to 34 carbon atoms and calcium, and a metal salt formed of long chain fatty acid having 10 to 34 carbon atoms and zinc; and
   0.1 to 5 parts by mass of a stress relaxant having a melting point of 67.5° C. to 200° C. when measured by using a differential scanning calorimeter at a flow rate of nitrogen of 20 cm$^3$/min and at a heating rate of 10° C./min.

3. A polyacetal resin composition comprising, per 100 parts by mass of a polyacetal resin:
   0.01 to 10 parts by mass of fatty acid metal salts, wherein the fatty acid metal salts are both of a metal salt formed of long chain fatty acid having 10 to 34 carbon atoms and calcium, and a metal salt formed of long chain fatty acid having 10 to 34 carbon atoms and magnesium; and
   0.1 to 5 parts by mass of a stress relaxant having a melting point of 67.5° C. to 200° C. when measured by using a differential scanning calorimeter at a flow rate of nitrogen of 20 cm 3/min and at a heating rate of 10° C./min.

4. The polyacetal resin composition described in claim 1, wherein the stress relaxant is selected from the group consisting of polyether ester amide block copolymer, polyolefin/polyether copolymer, polyamide/polyalkylene glycol block copolymer, polyethylene glycol having a number-average molecular weight of 20,000 or larger, and, polyethylene oxide having a number-average molecular weight of 20,000 or larger.

5. The polyacetal resin composition described in claim 1, being durable against a liquid containing hydrochloric acid.

6. The polyacetal resin composition described in claim 1, used for a fuel pump module.

7. The polyacetal resin composition described in claim 2, wherein the stress relaxant is selected from the group consisting of polyether ester amide block copolymer, polyolefin/polyether copolymer, polyamide/polyalkylene glycol block copolymer, polyethylene glycol having a number-average molecular weight of 20,000 or larger, and, polyethylene oxide having a number-average molecular weight of 20,000 or larger.

8. The polyacetal resin composition described in claim 2, being durable against a liquid containing hydrochloric acid.

9. The polyacetal resin composition described in claim 2, used for a fuel pump module.

10. The polyacetal resin composition described in claim 3, wherein the stress relaxant is selected from the group consisting of polyether ester amide block copolymer, polyolefin/polyether copolymer, polyamide/polyalkylene glycol block copolymer, polyethylene glycol having a number-average molecular weight of 20,000 or larger, and, polyethylene oxide having a number-average molecular weight of 20,000 or larger.

11. A molded article formed of a polyacetal resin composition described in claim 1.

12. The molded article of claim 11, used for a fuel pump module.

* * * * *